United States Patent
Zheng et al.

(10) Patent No.: US 11,016,892 B2
(45) Date of Patent: May 25, 2021

(54) CACHE SYSTEM AND OPERATING METHOD THEREOF

(71) Applicant: Shanghai Zhaoxin Semiconductor Co., Ltd., Shanghai (CN)

(72) Inventors: Xianpei Zheng, Shanghai (CN); Zhongmin Chen, Shanghai (CN); Weilin Wang, Shanghai (CN); Jiin Lai, Shanghai (CN); Mengchen Yang, Shanghai (CN)

(73) Assignee: Shanghai Zhaoxin Semiconductor Co., Ltd., Shanghai (CN)

( * ) Notice: Subject to any disclaimer, the term of this patent is extended or adjusted under 35 U.S.C. 154(b) by 41 days.

(21) Appl. No.: 16/662,034

(22) Filed: Oct. 24, 2019

(65) Prior Publication Data

US 2021/0096991 A1 Apr. 1, 2021

(30) Foreign Application Priority Data

Sep. 30, 2019 (CN) .......................... 201910940890.7

(51) Int. Cl.
*G06F 12/0811* (2016.01)
*G06F 12/128* (2016.01)

(52) U.S. Cl.
CPC ........ *G06F 12/0811* (2013.01); *G06F 12/128* (2013.01); *G06F 2212/1021* (2013.01); *G06F 2212/608* (2013.01)

(58) Field of Classification Search
CPC .................................................. G06F 12/0811
USPC ........................................................ 711/122
See application file for complete search history.

(56) References Cited

U.S. PATENT DOCUMENTS

| | | | |
|---|---|---|---|
| 6,338,120 B1* | 1/2002 | Hanley | G06F 12/125 |
| | | | 711/133 |
| 2004/0255282 A1* | 12/2004 | Eruhimov | G06F 11/3447 |
| | | | 717/151 |
| 2013/0151780 A1* | 6/2013 | Daly | G06F 12/121 |
| | | | 711/122 |

* cited by examiner

*Primary Examiner* — Jae U Yu
(74) *Attorney, Agent, or Firm* — JCIPRNET

(57) ABSTRACT

The present disclosure provides a cache system and an operating method thereof. The system includes an upper-level cache unit and a last level cache (LLC). The LLC includes a directory, a plurality of counters, and a register. The directory includes a status indicator recording a utilization status of the upper-level cache unit to the LLC. The counters are used to increase or decrease a counting value according to a variation of the status indicator, record an access number from the upper-level cache unit, and record a hit number of the upper-level cache unit accessing the LLC. According to the counting value, the access number, and the hit number, the first parameters of the register are controlled, so as to adjust a utilization strategy to the LLC.

26 Claims, 12 Drawing Sheets

CACHE SYSTEM AND OPERATING METHOD THEREOF

CROSS-REFERENCE TO RELATED APPLICATION

This application claims the priority benefit of China application serial no. 201910940890.7, filed on Sep. 30, 2019. The entirety of the above-mentioned patent application is hereby incorporated by reference herein and made a part of this specification.

BACKGROUND

Technical Field

The disclosure relates to a cache system and an operating method thereof, and particularly relates to a cache system and an operating method thereof capable of adjusting a related access strategy according to a utilization status of an upper-level cache unit to a last level cache (LLC).

Description of Related Art

In a multi-level multi-core cache system, threads on different cores compete with each other for the use of a last level shared cache. Regarding the whole system, the use and working efficiency of a Last Level Cache (LLC) is an important issue, and its impact on an overall performance is crucial.

In order to make a full use of the LLC to achieve better performance, it is necessary for technical personnel of the field to develop a cache operation mechanism capable of achieving better performance for relevant software and hardware.

SUMMARY

The disclosure is directed to a cache system and an operating method of the cache system, which are adapted to improve utilization efficiency of a Last Level Cache (LLC) to improve an overall system performance.

The disclosure provides a cache system including a first upper-level cache unit and an LLC. The LLC is coupled to the first upper-level cache unit, and includes a directory, a plurality of first counters, and a register. The directory includes a first status indicator recording utilization status of the first upper-level cache unit to the LLC. The first counters are used to respectively progressively increase or decrease a first counting value according to a variation of the first status indicator, record a first access number from the first upper-level cache unit, and record a first access hit number of the first upper-level cache unit accessing the LLC. A first parameter of the register is selected according to the first counting value, the first access number, and the first access hit number, so as to adjust a utilization strategy of the first upper-level cache unit to the LLC.

The disclosure provides an operating method of a cache system, the cache system includes a first upper-level cache unit and an LLC coupled together, and the operating method includes: recording utilization status of the upper-level cache unit to the LLC through a first status indicator of a directory of the LLC; respectively progressively increasing or decreasing a first counting value according to a variation of the first status indicator, recording a first access number from the first upper-level cache unit, and recording a first access hit number of the first upper-level cache unit accessing the LLC by using a plurality of first counters of the LLC; and selecting a first parameter of a register of the LLC according to the first counting value, the first access number, and the first access hit number, so as to adjust a utilization strategy of the first upper-level cache unit to the LLC.

Based on the above description, the cache system and the operating method thereof provided by the disclosure may adjust the utilization strategy of the first upper-level cache unit to the LLC through the directory, the register configured in the LLC, and the counting value of a utilization counter, the access number of an access counter and the access hit number of a hit counter corresponding to each of the upper-level cache units. In this way, the utilization strategy of each upper-level cache unit to the LLC is more flexible, so as to improve an overall operation performance, and avoid problems such as cache pollution, etc.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
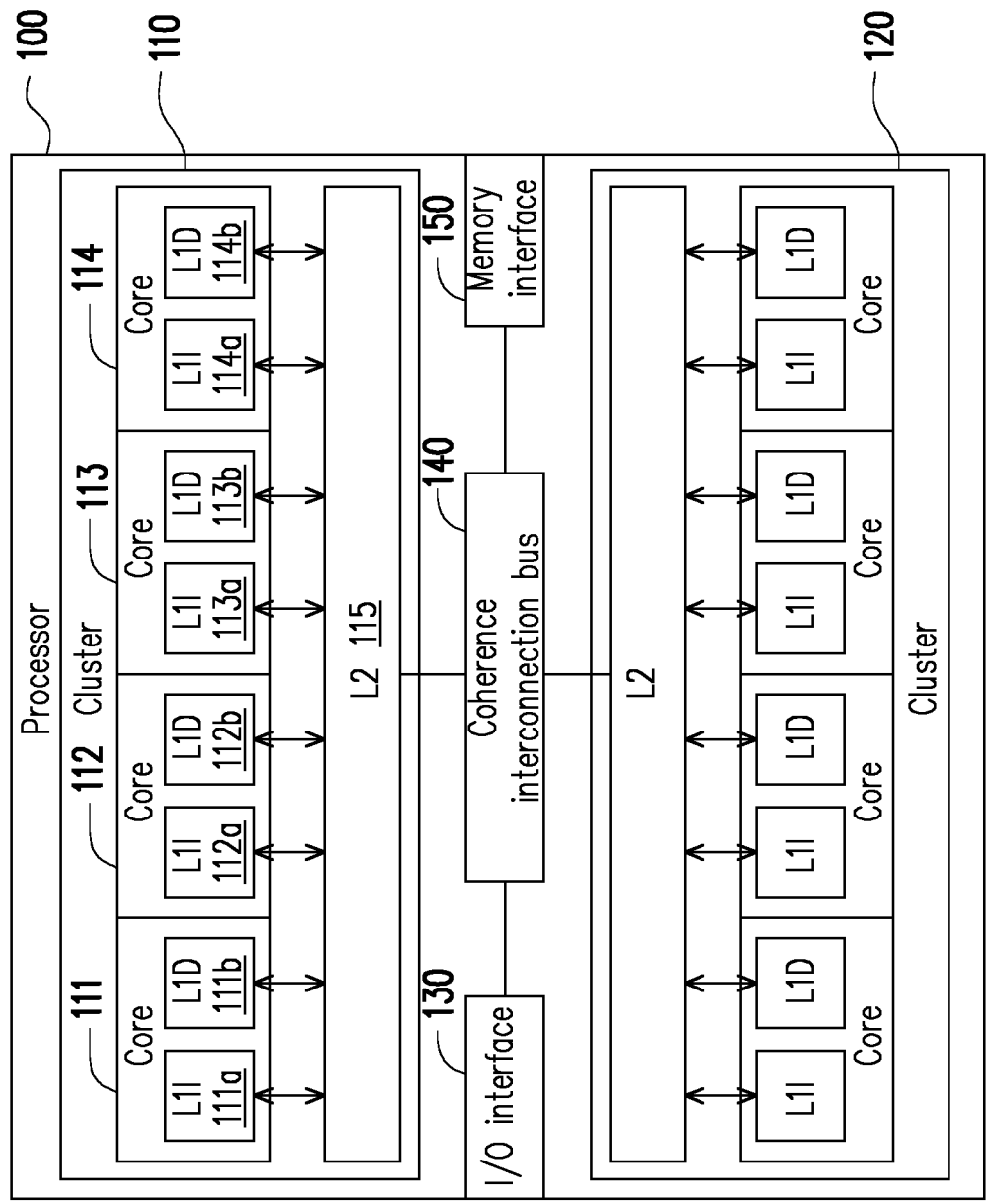
FIG. 1 is a schematic diagram of a processor with a level-2 cache architecture according to an embodiment of the disclosure.

Referring to FIG. 1, FIG. 1 is a schematic diagram of a processor with a level-2 cache architecture according to an embodiment of the disclosure. In the embodiment, the processor 100 includes a cluster 110, a cluster 120, an I/O interface 130, a coherence interconnection bus 140 and a memory interface 150, wherein the cluster 110, the cluster 120, the I/O interface 130 and the memory interface 150 are connected through the coherence interconnection bus 140.

In the embodiment, the cluster 110 and the cluster 120 are similar and don't have direct data exchange with each other, so that the following description is made for the cluster 110. As shown in FIG. 1, the cluster 110 includes a core 111, a core 112, a core 113, a core 114 and a second level cache 115, wherein the cores 111-114 respectively includes a first level data cache (L1D) and a first level instruction cache (L1I). To be specific, the core 111 includes a first level instruction cache 111a and a first level data cache 111b; the core 112 includes a first level instruction cache 112a and a first level data cache 112b; the core 113 includes a first level instruction cache 113a and a first level data cache 113b; and the core 114 includes a first level instruction cache 114a and a first level data cache 114b.

As shown in FIG. 1, the second level cache 115, the first level instruction caches 111a-114a and the first level data caches 111b-114b construct a level-2 cache system, wherein the second level cache 115 may be regarded as a Last Level Cache (LLC) of the level-2 cache system, and first level caches, including the first level instruction caches 111a-114a and the first level data caches 111b-114b, are upper-level cache units of the level-2 cache system. Under such framework, each of the first level instruction caches 111a-114a and each of the first level data caches 111b-114b are exclusive from each other, and each of the first level instruction caches 111a-114a and each of the first level data caches 111b-114b are all inclusive with the second level cache 115, i.e. each of the first level instruction caches 111a-114a and each of the first level data caches 111b-114b may not exchange data with each other, but may exchange data with the second level cache 115, thus threads of each of the first level instruction caches 111a-114a and each of the first level data caches 111b-114b may compete with each other for cache spaces of the second level cache 115, i.e. compete with each other for cache spaces of the LLC.

To be specific, the second level cache 115 may include K cache lines, wherein a $1^{st}$ cache line corresponds to a Most Recently Used (MRU) position, which is also referred to as a first cache line position, and a $K^{th}$ cache line corresponds to a Least Recently Used (LRU) position, which is also referred to as a $K^{th}$ cache line position. K may be a proper value determined according to a demand of a designer, which is, for example, 16, 32, 64, 128, etc., but the disclosure is not limited thereto.

In an embodiment, the processor searches a certain cache line, i.e. a target cache line from the first level instruction caches 111a-114a and the first level data caches 111b-114b, and when any of the first level instruction caches 111a-114a and the first level data caches 111b-114b has a cache miss, i.e. when the processor doesn't find the target cache line, it accordingly forms a utilization of the second level cache 115, i.e. to search the target cache line from the second level cache 115. When the second level cache line 115 has a cache hit, i.e. when the target cache line exists in the second level cache 115, the target cache line is acquired from the second level cache 114 and is inserted into the corresponding first level cache. When the second level cache line 115 also has the cache miss, then the target cache line is acquired from a memory, and is inserted to the MRU position of the K cache lines, so that the original $1^{st}$ cache line to $(K-1)^{th}$ cache line are stored as $2^{nd}$ cache line to $K^{th}$ cache line, and the original $K^{th}$ cache line is removed from the second level cache 115.

However, under some circumstances, the higher a cache miss rate of the first level cache is, the higher a utilization rate of the second level cache is, the more resources of the second level cache are occupied, meanwhile, the higher the cache miss rate of the first level cache, the higher a miss rate of the second level cache, i.e. the higher the probability of inserting the target cache line into the MRU position of the second level cache 115. That will occupy more resources of the second level cache, causes the threads that really need the cache space may not have enough resources, results in waste of resources, and degradation of the system performance.

Therefore, the disclosure provides a cache system, which may adaptively detect a utilization status of the utilization of the upper-level cache units to the LLC, and accordingly adjust related utilization strategy to improve the overall system performance. In different embodiments, the aforementioned upper-level cache units may have different meanings. For example, in the level-2 cache architecture shown in FIG. 1, the upper-level cache units may generally refer to the first level caches. However, in other embodiments, if a cache architecture of more levels is considered, other level caches besides the LLC are taken as the upper-level caches. For example, in a level-3 cache architecture, the third level cache is taken as the LLC, the first level caches and the second level caches are taken as the upper-level cache units of the third level cache, i.e. the upper-level cache units of the LLC.

Moreover, in case that the multiple cores of FIG. 1 are configured with a plurality of caches, a consistency protocol, such as a MESI protocol need to be used to make data within the caches consistent, so as to avoid chaos of system data. Taking the MESI protocol as an example, each cache line has 4 possible statuses, and each status may be represented by data of 2 bits, and the 4 statuses include "Modified (M)", "Exclusive (E)", "Shared (S)" and "Invalid (I)", and related descriptions thereof may refer to the MESI protocol, and details thereof are not repeated.

According to an embodiment of the disclosure, a directory is configured in the LLC, for example, in the second level cache 115 shown in FIG. 1, to record whether the upper-level cache units and the LLC share a target cache line according to the MESI status of the cache lines in the upper cache units.

Figure 2:
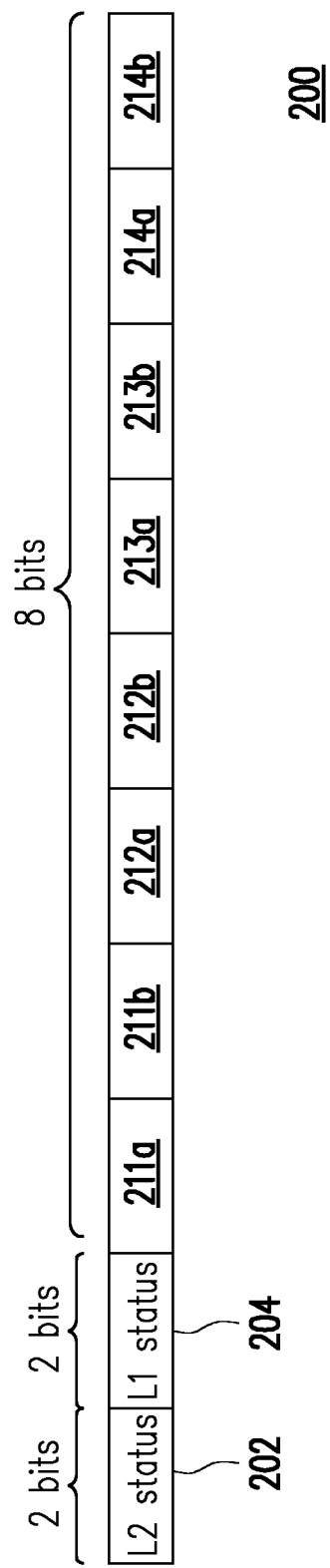
FIG. 2 is a schematic diagram of a directory in a Last Level Cache (LLC) according to the embodiment of FIG. 1.

Referring to FIG. 2, FIG. 2 is a schematic diagram of a directory in the LLC according to the embodiment of FIG. 1. In the embodiment, the directory 200 is, for example, disposed in the second level cache 115 of FIG. 1, and the directory 200 may include a second level cache status 202, a first level cache status 204, status indicators 211a, 212a, 213a, 214a, 211b, 212b, 213b and 214b, wherein the status indictors 211a-214a respectively correspond to the first level instruction caches 111a-114a of FIG. 1, and the status indictors 211b-214b respectively correspond to the first level data caches 111b-114b of FIG. 1, but the disclosure is not limited thereto.

According to an embodiment of the disclosure, the MESI protocol is applied to the whole cache system to use the second level cache status 202 of two bits to represent whether cache lines of the second level cache 115 of FIG. 1 may be shared. The first level cache status 204 of two bits is used to represent whether cache lines of each of the first level caches of FIG. 1 may be shared. The status indicators 211a-214a and 211b-214b of one bit are used to record whether the target cache line simultaneously exists in the first level caches and the second level cache, so as to reflect the utilization status of the upper-level cache units to the LLC.

According to another embodiment of the disclosure, the MESI protocol is applied to the whole cache system to use the second level cache status 202 of two bits to represent whether the second level cache 115 of FIG. 1 may share a cache line with other module, such as the other cluster or a first level cache. The first level cache status 204 of two bits is used to represent whether each of the first level caches of FIG. 1 may share a cache line with other module, such as the second level cache 115.

Figure 3A:
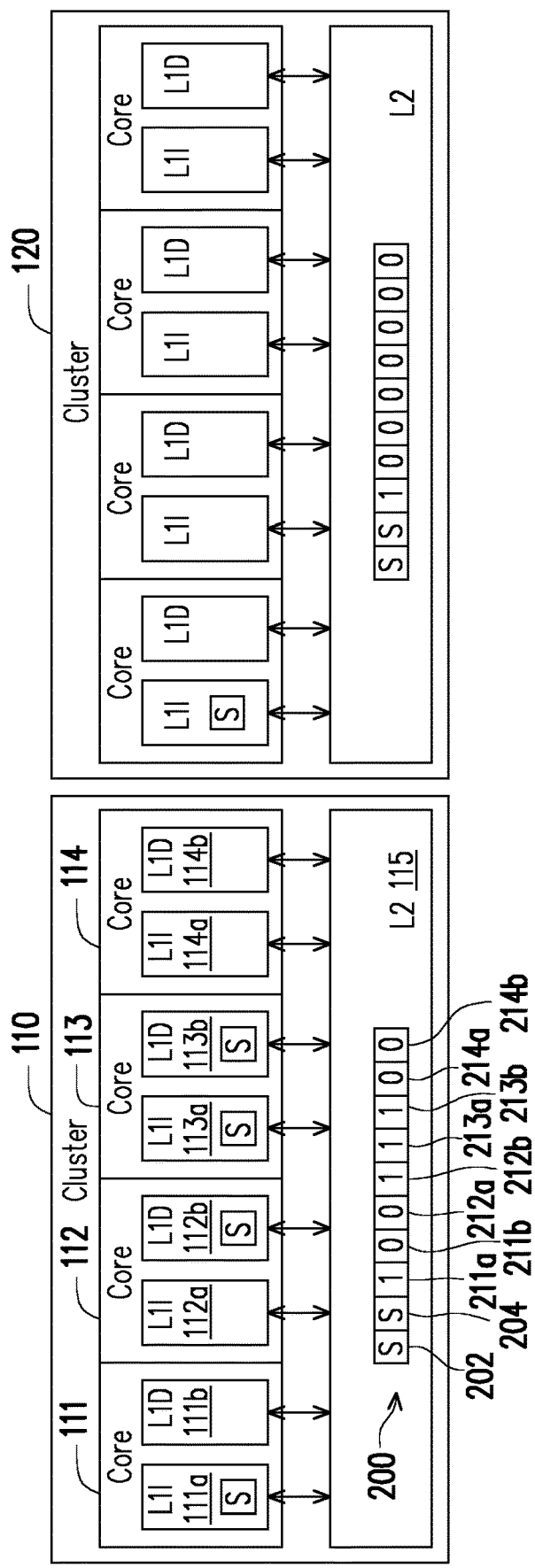
FIG. 3A is a schematic diagram of using a directory to record multi-level cache statuses according to the embodiment of FIG. 1 and FIG. 2.

Referring to FIG. 3A, FIG. 3A is a schematic diagram of using a directory to record multi-level cache statuses according to the embodiment of FIG. 1 and FIG. 2. In the embodiment, the second level cache status 202 and the first level cache status 204 of the directory 200 are all "S", which represents that each of the first level caches in the cluster 110 and the cluster 120 of FIG. 3A may share the target cache line with the second level cache 115. Moreover, since the first level instruction cache 111a, the first level data cache 112b, the first level instruction cache 113a, and the first level data cache 113b are sharing the target cache line with the second level cache 115, i.e. the target cache line is simultaneously existing in the first level instruction cache 111a, the first level data cache 112b, the first level instruction cache 113a, and the first level data cache 113b and the second level cache 115, the status indicators 211a, 212b, 213a and 213b corresponding to the first level instruction cache 111a, the first level data cache 112b, the first level instruction cache 113a, and the first level data cache 113b are all 1. Conversely, since the first level data cache 111b, the first level instruction cache 112a, the first level instruction cache 114a, and the first level data cache 114b aren't sharing the target cache line with the second level cache 115, the first level instruction cache 112a, the first level instruction cache 114a, and the first level data cache 114b do not have the target cache line, the status indicators 211b, 212a, 214a and 214b corresponding to the first level data cache 111b, the first level instruction cache 112a, the first level instruction cache 114a, and the first level data cache 114b are all 0.

Based on the above instruction, those with ordinary skills in the art should have a corresponding understanding of the status indicators of the directory (not indicated) in the cluster 120, and descriptions thereof are omitted.

Figure 3B:
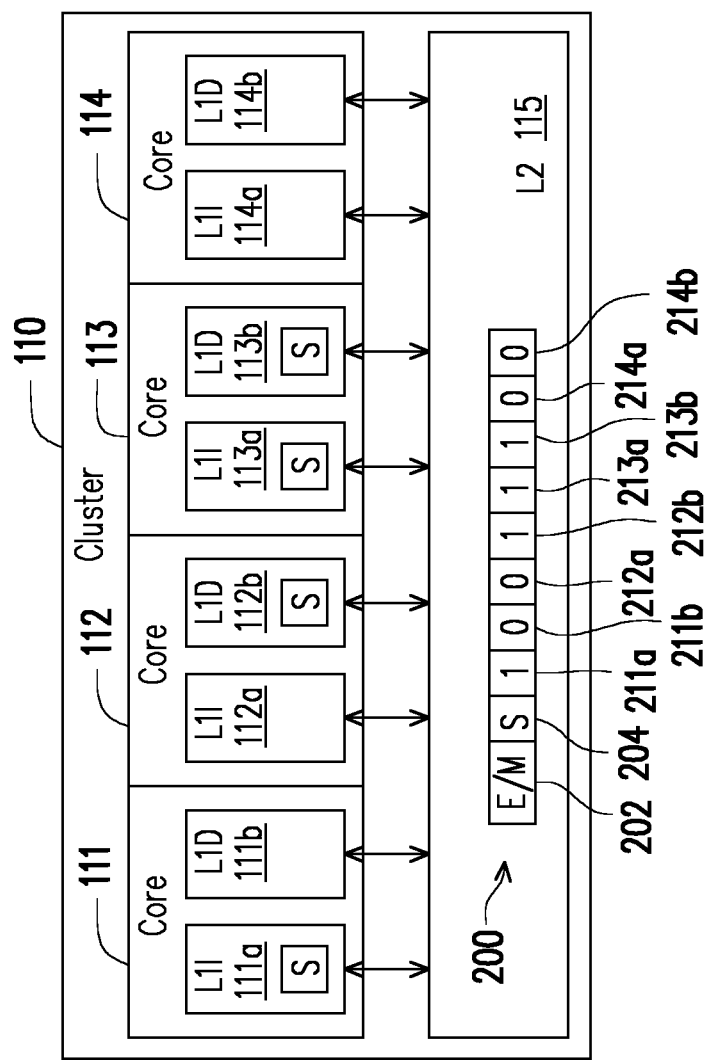
FIG. 3B is another schematic diagram of using a directory to record multi-level cache statuses according to the embodiment of FIG. 1 and FIG. 2.

Referring to FIG. 3B, FIG. 3B is another schematic diagram of using a directory to record multi-level cache statuses according to the embodiment of FIG. 1 and FIG. 2. In the embodiment, the second level cache status 202 of the directory 200 is the "E/M" status, which represents that the target cache line is exclusively owned by the cluster 110. Moreover, the L1 status 204 is the "S", which represents that the first level instruction caches 111a-114a and the first level data caches 111b-114b in the cluster 110 may share the target cache line with the second level cache 115. Moreover, the pattern of the status indicators 211a-214a and 211b-214b is the same as that shown in FIG. 3A, and the meanings thereof may refer to the related description of FIG. 3A, and details thereof are not repeated.

Figure 3C:
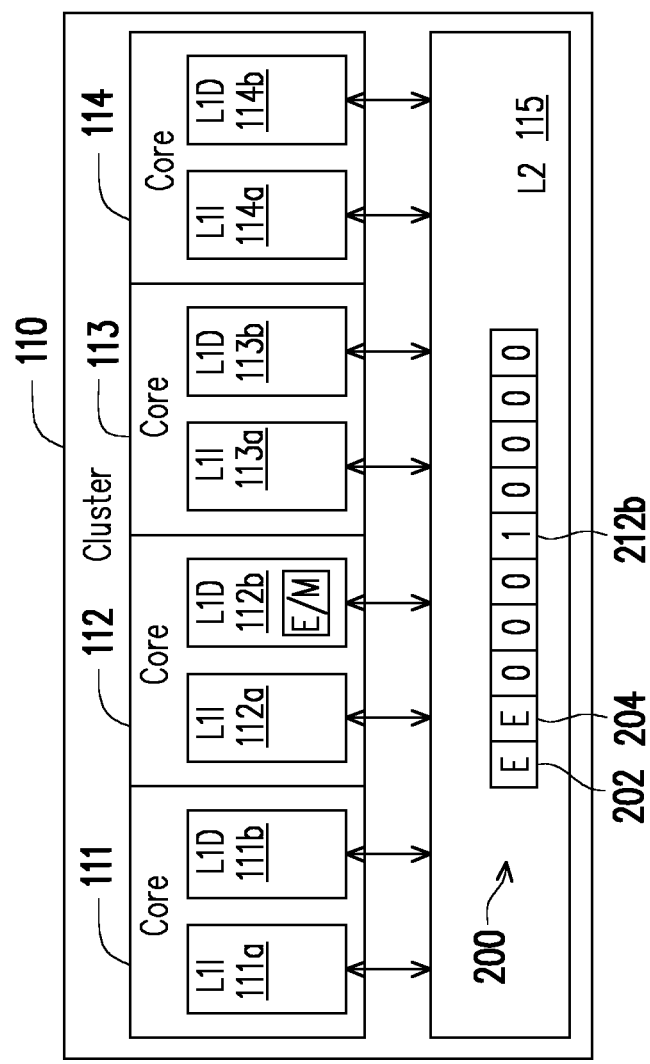
FIG. 3C is another schematic diagram of using a directory to record multi-level cache statuses according to the embodiment of FIG. 1 and FIG. 2.

Referring to FIG. 3C, FIG. 3C is another schematic diagram of using a directory to record multi-level cache statuses according to the embodiment of FIG. 1 and FIG. 2. In the embodiment, the second level cache status 202 of the directory 200 is the "E" status, which represents that the target cache line is exclusively owned by the cluster 110. Moreover, the L1 status 204 is the "E" status, which represents that one of the first level instruction caches 111a-114a and the first level data caches 111b-114b in the cluster 110 may share the target cache line with the second level cache 115 alone. Moreover, since the situation shown in FIG. 3C is that the first level data cache 112b shares the target cache line with the second level cache 115 alone, the status indicator 212b may be correspondingly indicated as 1.

Figure 4:
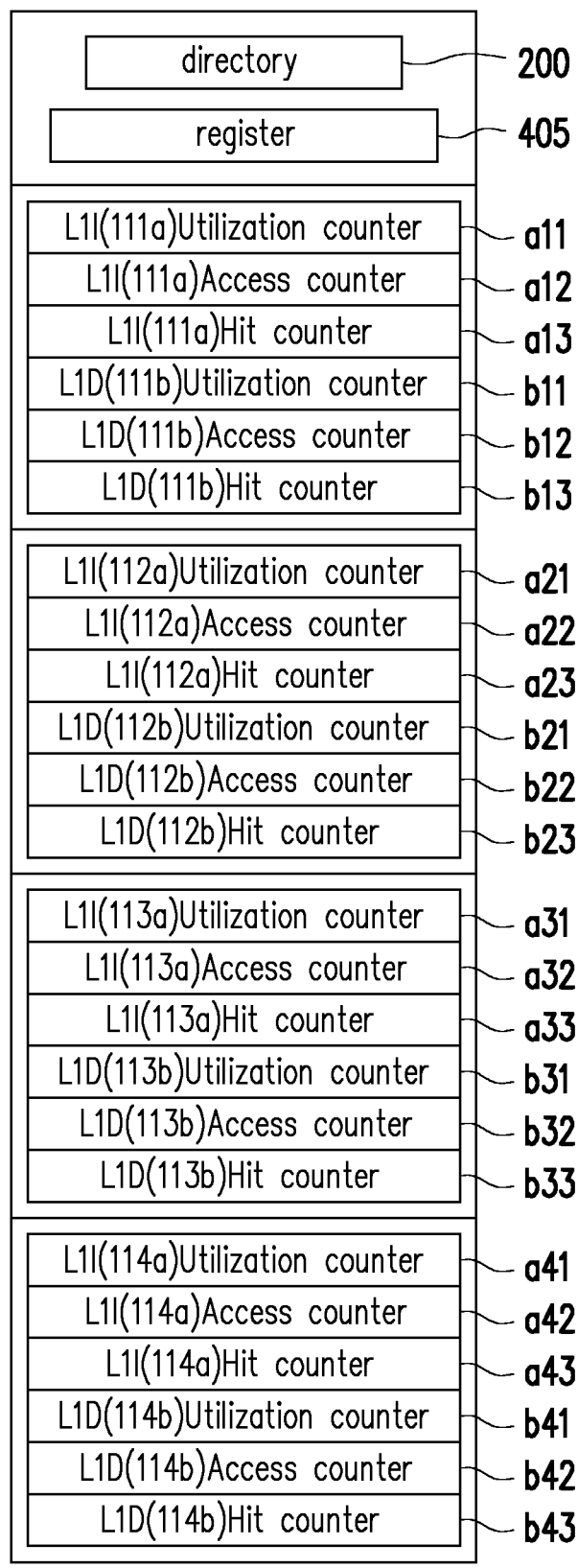
FIG. 4 is a schematic diagram of a second level cache according to the embodiment of FIG. 1 and FIG. 2.

Referring to FIG. 4, FIG. 4 is a schematic diagram of a second level cache according to the embodiment of FIG. 1 and FIG. 2. In the embodiment, the second level cache 115, i.e. the LLC, includes the directory 200, a register 405, utilization counters a11, b11, a21, b21, a31, b31, a41 and b41, access counters a12, b12, a22, b22, a32, b32, a42 and b42, and hit counters a13, b13, a23, b23, a33, b33, a43 and b43.

In the second level cache 115, the utilization counter a11, the access counter a12 and the hit counter a13 may correspond to the first level instruction cache 111a of FIG. 1. The utilization counter b11, the access counter b12 and the hit counter b13 may correspond to the first level data cache 111b of FIG. 1. The utilization counter a21, the access counter a22 and the hit counter a23 may correspond to the first level instruction cache 112a of FIG. 1. The utilization counter b21, the access counter b22 and the hit counter b23 may correspond to the first level data cache 112b of FIG. 1. The utilization counter a31, the access counter a32 and the hit counter a33 may correspond to the first level instruction cache 113a of FIG. 1. The utilization counter b31, the access counter b32 and the hit counter b33 may correspond to the first level data cache 113b of FIG. 1. The utilization counter a41, the access counter a42 and the hit counter a43 may correspond to the first level instruction cache 114a of FIG. 1. The utilization counter b41, the access counter b42 and the hit counter b43 may correspond to the first level data cache 114b of FIG. 1.

In FIG. 4, the utilization counters, the access counters and the hit counters may be used for recording specific counting values for the corresponding first level caches. Description is made below based on the first level instruction cache 111a and the corresponding utilization counter a11, the access counter a12 and the hit counter a13.

In an embodiment, the utilization counter a11 may progressively increase or decrease a counting value according to a variation of the status indicator 211a in FIG. 2. For example, when the status indicator 211a is changed from 0 to 1, it represents a change from nonexistence to existence of a target cache line shared with the second level cache 115 in the first level instruction cache 111a, and the first level instruction cache 111a generates a utilization of a cache space of the second level cache 115, the utilization counter a11 progressively increases its own counting value. Conversely, when the status indicator 211a is changed from 1 to 0, it represents a change from existence to nonexistence of a target cache line shared with the second level cache 115 in the first level instruction cache 111a, and the first level instruction cache 111a decreases the utilization of the cache space of the second level cache 115, the utilization counter a11 progressively decreases its own counting value. In this case, the higher the counting value of the utilization counter a11 is, the more the target cache lines are shared by the first level instruction cache 111a and the second level cache 115, and the more the first level instruction cache 111a occupies the cache space of the second level cache 115.

The access counter a12 may record an access number from the first level instruction cache 111a for the second level cache 115. Namely, as long as the second level cache 115 detects the access from the first level instruction cache 111a, the access counter a12 may progressively increases its own counting value. In other words, the counting value of the access counter a12 is a total access number of accesses from the first level instruction cache 111a to the second level cache 115.

The hit counter a13 may record a hit number of the first level instruction cache 111a accessing the second level cache 115. Namely, when an access from the first level instruction cache 111a is hit in the second level cache 115, the counting value of the hit counter a13 is progressively increased.

Similarly, in an embodiment, the first level data cache 111b and the corresponding utilization counter b11, the access counter b12 and the hit counter b13 may also operate based on the same mechanism.

To be specific, the utilization counter b11 may progressively increase or decrease a counting value according to a variation of the status indicator 211b in FIG. 2. For example, when the status indicator 211b is changed from 0 to 1, it represents a change from nonexistence to existence of a target cache line shared with the second level cache 115 in the first level data cache 111b, and the first level data cache 111b generates a utilization of a cache space of the second level cache 115, and the utilization counter b11 progressively increases its own counting value. Conversely, when the status indicator 211b is changed from 1 to 0, it represents a change from existence to nonexistence of a target cache line shared with the second level cache 115 in the first level data cache 111b, and the first level data cache 111b decreases the utilization of the cache space of the second level cache 115, and the utilization counter b11 progressively decreases its own counting value. In this case, the higher the counting value of the utilization counter b11 is, the more the target cache lines are shared by the first level data cache 111b and the second level cache 115, and the more the first level data cache 111b occupies the cache space of the second level cache 115.

The access counter b12 may record an access number from the first level data cache 111b. Namely, as long as the second level cache 115 detects the access from the first level data cache 111b, the access counter b12 may progressively increase its own counting value. In other words, the counting value of the access counter b12 is a total access number of accesses from the first level data cache 111b to the second level cache 115.

The hit counter b13 may record an access hit number of the first level data cache 111b accessing the second level cache 115. Namely, when an access from the first level data cache 111b is hit in the second level cache 115, the counting value of the hit counter b13 is progressively increased.

Based on the above instruction, those skilled in the art may learn the operation mechanism of other first level caches and the corresponding utilization counters, the access counters and the hit counters in FIG. 4, and detail thereof is not repeated.

According to an embodiment of the disclosure, parameters corresponding to the first level instruction cache 111a in the register 405 are controlled according to the counting value of the utilization counter a11, the access number of the access counter a12, and the access hit number of the hit counter a13, so as to adjust a utilization strategy of the first level instruction cache 111a to the second level cache 115. Moreover, parameters corresponding to the first level data cache 111b in the register 405 are controlled according to the counting value of the utilization counter b11, the access number of the access counter b12, and the access hit number of the hit counter b13, so as to adjust a utilization strategy of the first level data cache 111b to the second level cache 115. Similarly, parameters corresponding to any of the first level caches of FIG. 4 in the register 405 are controlled according to the counting value of the utilization counter, the access number of the access counter and the access hit number of the hit counter corresponding to the first level cache, so as to adjust a utilization strategy of the first level cache to the second level cache 115.

According to an embodiment of the disclosure, by controlling control parameters of the corresponding first level cache in the register 405 according to the counting value of each utilization counter, the access number of the access counter and the access hit number of the hit counter, the utilization strategies of the upper-level cache units to the LLC between each other, such as, the utilization strategies of the first level instruction caches 111a-114a and the first level data caches 111b-114b to the second level cache 115 between each other, are coordinated.

To simplify the related description, the first level instruction cache 111a is taken as an example to describe the technical means of the disclosure, and those skilled in the art may accordingly deduce operation mechanisms of other first level caches.

As described in the aforementioned embodiment, generally, the target cache line missed in the second level cache 115 may be found in the memory and then inserted to the MRU position in the second level cache 115, which may cause a defect of system performance degradation. In order to ameliorate the defect, the register 405 is configured to control a frequency of inserting the target cache line to the MRU position and control an insertion position of the target cache line. In a different embodiment, the parameters of the register 405 may be adjusted to implement the mechanism of adjusting the aforementioned insertion position and insertion frequency.

Figure 5:
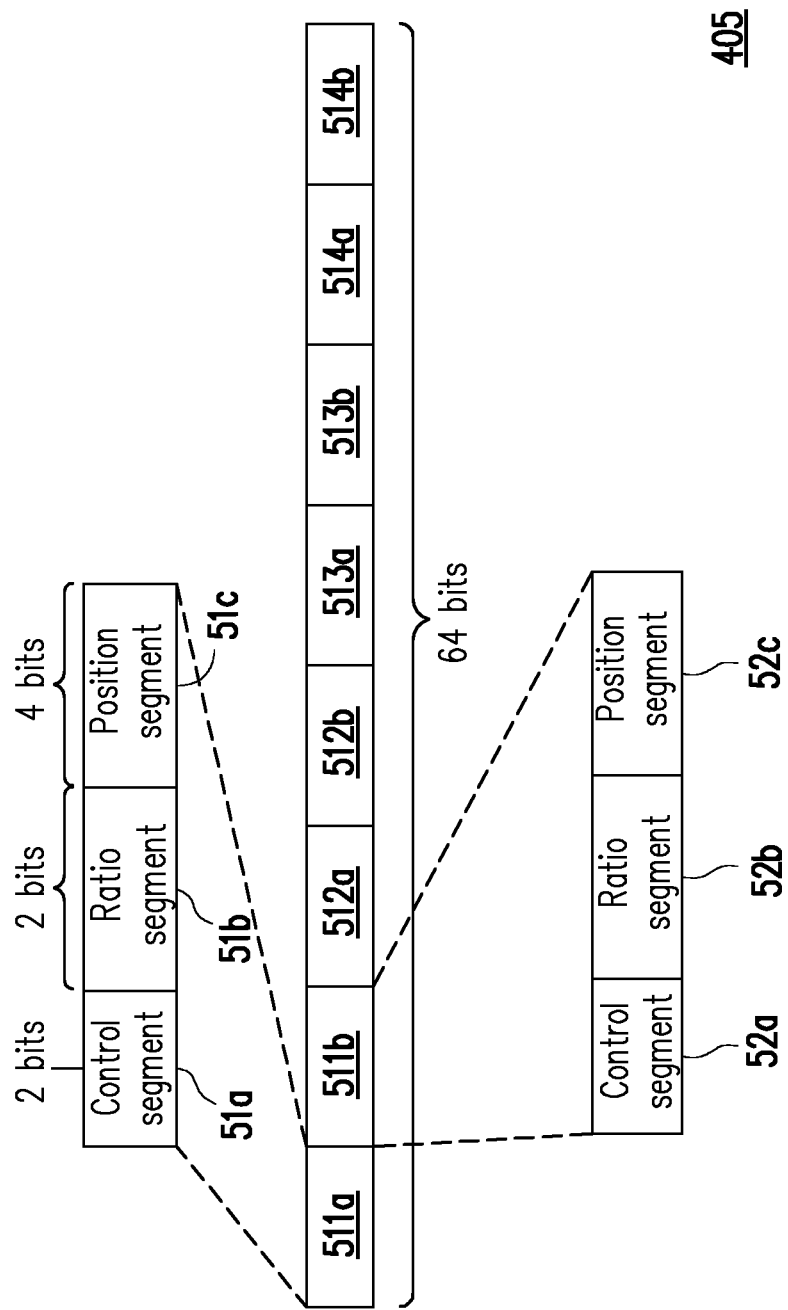
FIG. 5 is a structural diagram of a register illustrated according to FIG. 4.

Referring to FIG. 5, FIG. 5 is a structural diagram of a register illustrated according to FIG. 4. As shown in FIG. 5, the register 405 includes segments 511a, 512a, 513a, 514a, 511b, 512b, 513b and 514b, wherein the segments 511a-514a respectively correspond to the first level instruction caches 111a-114a of FIG. 1, and the segments 511b-514b respectively correspond to the first level data caches 111b-114b of FIG. 1, but the disclosure is not limited thereto.

In the embodiment, each of the segments 511a-514a, 511b-514b has the same structure, so that in the following description, only the segment 511a corresponding to the first level instruction cache 111a is taken as an example for description.

In FIG. 5, the segment 511a may include a control segment 51a, a ratio segment 51b and a position segment 51c, wherein individual lengths thereof may be 2 bits, 2 bits and 4 bits, and a length of the register 405 is, for example, 64 bits, but the disclosure is not limited thereto.

The control segment 51a includes a control parameter, and the control parameter may instruct to insert the target cache line to a specified position or the MRU position in the second level cache 115. In an embodiment, operations corresponding to the values of the control parameter are shown in a following table 1.

TABLE 1

| Control parameter | Operation |
|---|---|
| 00 | Insert the target cache line to the MRU position |
| 01 | Insert the target cache line to the specified position in collaboration with the ratio segment 51b and the position segment 51c |
| 10 | reserved |
| 11 | reserved |

In detail, when the control parameter is 0 (00), the target cache line may be fixedly inserted to the MRU position in the second level cache 115. On the other hand, when the control parameter is 1 (01), the target cache line is inserted to the specified position in collaboration with setting of the ratio segment 51b and the position segment 51c. In brief, in the embodiment of the disclosure, the value of the control parameter may be adjusted to determine whether the target cache line is always inserted to the MRU position or inserted into the specified position. The target cache line corresponds to the cache miss of the upper-level cache unit 111a, and corresponds to the missed cache line in the LLC 115. In other embodiments, a designer may also design corresponding operations for different control parameters according to actual requirements, which is not limited herein.

The ratio segment 51b includes an insert ratio parameter, and the insert ratio parameter instructs to insert the target cache line to the MRU position of the second level cache 115 after every (N-1) cache misses in the second level cache 115, wherein N is a positive integer. In an embodiment, operations corresponding to the values of the insert ratio parameter are shown in a following table 2.

TABLE 2

| Insert ratio parameter | N | Operation |
|---|---|---|
| 00 | 16 | The target cache line is inserted to the MRU position of the second level cache 115 after every 15 cache misses |
| 01 | 32 | The target cache line is inserted to the MRU position of the second level cache 115 after every 31 cache misses |
| 10 | 64 | The target cache line is inserted to the MRU position of the second level cache 115 after every 63 cache misses |
| 11 | 128 | The target cache line is inserted to the MRU position of the second level cache 115 after every 127 cache misses |

It should be noted that if the control parameter is 0 (00), the target cache line may always be inserted to the MRU position, so that the insert ratio parameter has no effect on the insertion/replacement mechanism of the target cache line in the second level cache 115. In other words, in the embodiment, only when the control parameter is 1 (01), the value of the insert ratio parameter may has an effect on the insertion/replacement mechanism of the target cache line in the second level cache 115.

The position segment 51c includes an insert position parameter, and the insert position parameter may define the aforementioned specified position. In an embodiment of the disclosure, in case that the aforementioned value K is 16, operations corresponding to the values of the insert position parameter are shown in a following table 3. Based on the instruction of the table 3, those skilled in the art should be able to understand how to define the specified position in case that the value K is other values.

TABLE 3

| Insert position parameter | Operation |
|---|---|
| 0000 | The specified position is the MRU position (the $1^{st}$ cache line position) |
| 0001 | The specified position is the $2^{nd}$ cache line position adjacent to the MRU position |

TABLE 3-continued

| Insert position parameter | Operation |
|---|---|
| 0010 | The specified position is the $3^{rd}$ cache line position |
| 0011 | The specified position is the $4^{th}$ cache line position |
| ... | |
| 1110 | The specified position is the $15^{th}$ cache line position |
| 1111 | The specified position is the LRU position |

In an overview of the control segment 51a, the ratio segment 51b and the position segment 51c, when the control parameter of the control segment 51a is 1 (01), (N-1) continuous target cache lines are inserted to the specified position defined by the insert position parameter, and the $N^{th}$ target cache line is inserted to the MRU position.

For example, when the control parameter of the control segment 51a is 1 (00), the insert ratio parameter of the ratio segment 51b is 0 (00), the insert position parameter of the position segment 51c is 3 (0011), in case that N is equal to 16, 15 continuous target cache lines may be inserted to the $4^{th}$ cache line position of the second level cache 115 specified by the insert position parameter, and the original $4^{th}$ to the original $(k-1)^{th}$ cache lines of the second level cache 115 are shifted by one position towards the LRU position of the second level cache 115, and the original $K^{th}$ cache line of the LRU position in the second level cache 115 is removed. The $16^{th}$ target cache line is inserted to the MRU position in the second level cache 115, and the original $1^{st}$ to the $(k-1)^{th}$ cache lines in the second level cache 115 become the $2^{nd}$ to the $k^{th}$ cache lines, and the original $K^{th}$ cache line in the second level cache 115 is removed. Moreover, the $17^{th}$ to the $31^{th}$ target cache lines are inserted to the $4^{th}$ cache line position, and the $32^{th}$ target cache line is inserted to the MRU position in the second level cache 115.

For another embodiment, when the control parameter of the control segment 51a is 1 (01), the insert ratio parameter of the ratio segment 51b is 2 (10), the insert position parameter of the position segment 51c is 2 (0010), in case that N is set to 64, 63 continuous target cache lines may be inserted to the $3^{rd}$ cache line position (i.e. the specified position defined by the insert position parameter), and the $64^{th}$ target cache line is inserted to the MRU position in the second level cache 115. Moreover, the $65^{th}$ to the $127^{th}$ target cache lines may be inserted to the $3^{rd}$ cache line position, and the $128^{th}$ target cache line is inserted to the MRU position in the second level cache 115.

In this way, the utilization strategy of the first level instruction cache 111a to the second level cache 115 may be more flexible, so as to improve the whole operation performance, and avoid problems such as cache pollution, etc. To be specific, as described above, when the counting value of the utilization counter a11 is relatively high, it represents that the first level instruction cache 111a occupies more cache space of the second level cache 115. In this case, if a ratio between the access hit number of the hit counter a13 and the access number of the access counter a12 is relatively low, it represents that the cache miss rate is relatively high. In this case, by setting the control parameter of the control segment 51a to 1 (01), the utilization strategy of the first level instruction cache 111a to the second level cache 115 may be adjusted in collaboration with the insert ratio parameter in the ratio segment 51b and the insert position parameter in the position segment 51c, so as to shorten the time that the target cache line exists in the second level cache 115. For example, when the cache miss rate of the first level instruction cache 111a is relatively high, the value of N may be set to a larger value by adjusting the insert ratio parameter and/or the specified position may be set to be closer to the LRU position by adjusting the insert position parameter.

In this way, after the target cache line is inserted to the specified position of the second level cache 115, such target cache line will be moved to the LRU position more quickly along with insertion of the subsequent new cache lines due to that the target cache line is closer to the LRU position, and further be more quickly removed from the second level cache 115. In this way, the cache space of the second level cache 115 is not excessively occupied by the first level instruction cache 111a with the higher cache miss rate, so as to achieve better performance.

Conversely, if the ratio between the access hit number of the hit counter a13 and the access number of the access counter a12 is relatively high, it represents that the cache miss rate is relatively low. In this case, by setting the control parameter of the control segment 51a to 1, in collaboration with adjusting the insert ratio parameter in the ratio segment 51b and the insert position parameter in the position segment 51c, the utilization strategy of the first level instruction cache 111a to the second level cache 115 may be adjusted, so as to prolong a time that the target cache line exists in the second level cache 115. For example, when the cache miss rate of the first level instruction cache 111a is relatively low, the value of N may be set to a smaller value by adjusting the insert ratio parameter and/or the specified position may be set to be farther away from the LRU position by adjusting the insert position parameter.

In this way, after the target cache line is inserted to the specified position of the second level cache 115, such target cache line will be pushed to the LRU position slowly along with insertion of the subsequent new target cache lines due to that the target cache line is farther away from the LRU position, so as to prolong the time that the target cache line exists in the second level cache 115. In this way, the cache space of the second level cache 115 may be configured to the first level instruction cache 111a with the lower cache miss rate, so as to achieve more effective utilization.

Similarly, the control segments 512a-514a, 511b-514b of the register 405 may also be used to respectively adjust the utilization strategies of the first level instruction cache 112a-114a and the first level data caches 111b-114b to the second level cache 115.

Taking the first level data cache 111b (which belongs to the same core 111 as the first level instruction cache 111a) and the corresponding segment 511b as an example, the segment 511b may also include a control segment 52a, a ratio segment 52b and a position segment 52c. In the segment 511b, the control segment 52a may record a control parameter, and the control parameter may instruct to insert the target cache line to a specified position or the MRU position of the cache lines in the second level cache 115; the ratio segment 52b may record an insert ratio parameter, and the insert ratio parameter may indicate to insert the $M^{th}$ target cache line to the MRU position of the cache lines of the second level cache 115 after every (M−1) target cache lines, wherein M is a positive integer; the position segment 52c may record an insert position parameter, and the insert position parameter may define the aforementioned specified position, wherein the target cache line corresponds to the cache miss of the upper-level cache unit 111b, and corresponds to the missed cache line in the LLC 115.

In an overview of the control segment 52a, the ratio segment 52b and the position segment 52c of the segment 511b, when the control parameter of the control segment 52a is 1, (M−1) continuous target cache lines are inserted to the specified position defined by the insert position parameter of the position segment 52c, and the $M^{th}$ target cache line is inserted to the MRU position. In this case, the utilization strategy of the first level data cache 111b to the second level cache 115 may be adjusted more flexibly according to a situation that the first level data cache 111b occupies the cache space of the second level cache 115.

Taking the first level instruction cache 112a and the corresponding segment 512a as an example, the segment 512a may also include a control segment (not indicated), a ratio segment (not indicated) and a position segment (not indicated), wherein the first level instruction cache 112a and the first level instruction cache 111a respectively belongs to the core 111 and the core 112 of the cluster 110. In the segment 512a, the control segment may record a control parameter, and the control parameter may instruct to insert the target cache line to a specified position or the MRU position of the cache lines of the second level cache 115; the ratio segment may record an insert ratio parameter, and the insert ratio parameter may indicate to insert the $M'^{th}$ target cache line to the MRU position of the cache lines of the second level cache 115 after every (M'−1) target cache lines, wherein M' is a positive integer; the position segment may record an insert position parameter, and the insert position parameter may define the aforementioned specified position.

In an overview of the control segment, the ratio segment and the position segment of the segment 512a, when the control parameter of the control segment is 1(01), (M'−1) continuous target cache lines are inserted to the specified position defined by the insert position parameter of the position segment, and the $M'^{th}$ target cache line is inserted to the MRU position. In this case, the utilization strategy of the first level instruction cache 112a to the second level cache 115 may be adjusted more flexibly according to a situation that the first level instruction cache 112a occupies the cache space of the second level cache 115.

Moreover, the values of the control parameter, the insert ratio parameter and the insert position parameter in the register 405 may be controlled according to the counting value of the utilization counter, the access number of the access counter and the access hit number of the hit counter corresponding to the first level caches of other clusters in the second level cache, so as to adjust the utilization strategies of the first level caches of different clusters to the second level cache, and details thereof may refer to the instruction of the aforementioned embodiment, which are not repeated.

In other embodiments, the aforementioned mechanism may also be applied to a level-3 cache architecture, which is described in detail below.

Figure 6:
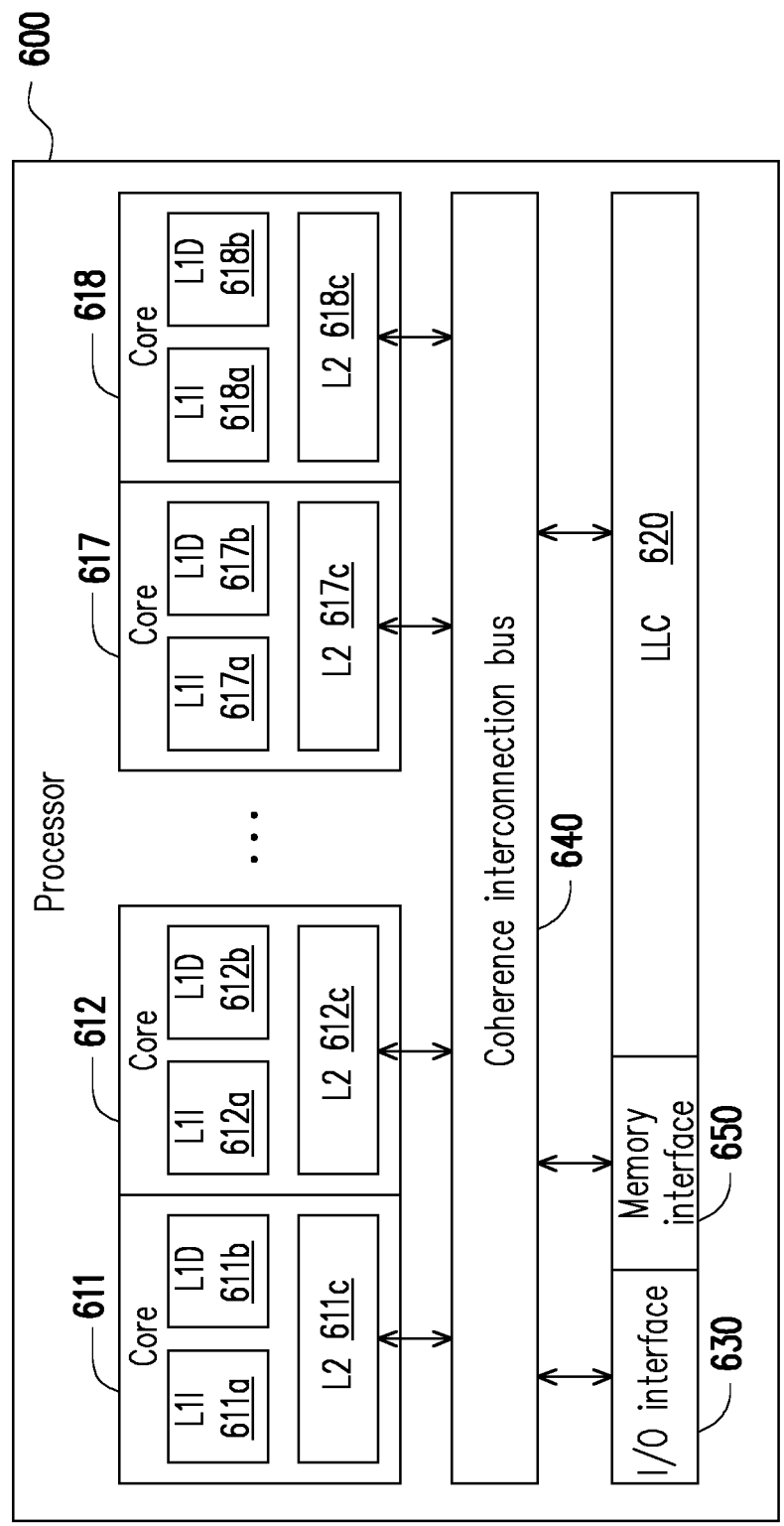
FIG. 6 is a schematic diagram of a processor with a level-3 cache architecture according to an embodiment of the disclosure.

Referring to FIG. 6, FIG. 6 is a schematic diagram of a processor with a level-3 cache architecture according to an embodiment of the disclosure. In the embodiment, the processor 600 includes cores 611, 612, . . . , 617, 618, an LLC 620, an I/O interface 630, a coherence interconnection bus 640 and a memory interface 650, wherein the LLC 620, the cores 611-618, the I/O interface 630 and the memory interface 650 are connected through the coherence interconnection bus 640. The cores 611-618 may respectively include a first level data cache, a first level instruction cache and a second level cache. To be specific, the core 611 may include a first level instruction cache 611a, a first level data cache 611b and a second level cache 611c; the core 612 may include a first level instruction cache 612a, a first level data cache 612b and a second level cache 612c; . . . ; the core 617 may include a first level instruction cache 617a, a first level data cache 617b and a second level cache 617c; and the core 618 may include a first level instruction cache 618a, a first level data cache 618b and a second level cache 618c.

In an embodiment of the disclosure, the third level cache 620, the first level instruction cache 611a-618a, the first level data cache 611b-618b and the second level cache 611c-618c construct a level-3 cache system, wherein the upper-level cache unit includes the first level instruction cache 611a-618a, the first level data cache 611b-618b and the second level cache 611c-618c, and the LLC is the third level cache 620. Under such architecture, threads on each of the cores 611-618 may compete with each other for the cache space on the LLC 620.

To be specific, the LLC 620 may include K cache lines, wherein the $1^{st}$ cache line may correspond to the MRU position, and the $K^{th}$ cache line may correspond to the LRU position, but the disclosure is not limited thereto. In other embodiments, K may be a proper value determined according to a demand of the designer, which is, for example, 16, 32, 64, 128, etc., but the disclosure is not limited thereto.

In an embodiment, as described above, when cache missed in the upper-level cache unit, it may have a chance that the target cache line will be inserted to the MRU position in the LLC 620, and the original $1^{st}$ cache line to the $(K-1)^{th}$ cache line will be stored as the $2^{nd}$ cache line to the $K^{th}$ cache line, and the original $K^{th}$ cache line will be removed from the LLC 620.

However, some first level caches and/or second level caches have a higher cache miss occurrence rate, which causes unnecessary occupation of the cache space of the LLC 620, so that the thread that really needs the cache space probably cannot use enough resources, and the probability of inserting the target cache line to the MRU position in the LLC 620 is increased, which decreases the system performance.

Therefore, the disclosure provides a cache system, which may adaptively adjusts the related utilization strategies according to the utilization situation of the upper-level cache units to the LLC, so as to improve the overall system efficiency. As mentioned above, the first level caches in each of the cores 611-618, including the first level instruction caches and the first level data caches, and the second level caches may be referred to as the upper-level cache units of the LLC 620. Moreover, to facilitate description of the technical solution of the disclosure, it is assumed that the cache system of the disclosure operates based on the MESI protocol. Accordingly, the LLC 620 is configured with a directory recording the related states of the upper-level cache units.

Figure 7:
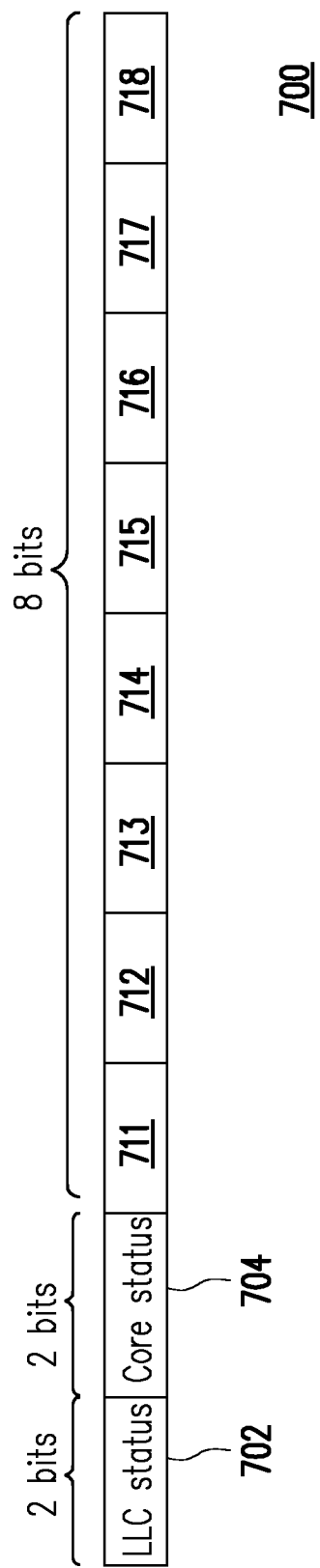
FIG. 7 is a schematic diagram of a directory in an LLC according to the embodiment of FIG. 6.

Referring to FIG. 7, FIG. 7 is a schematic diagram of a directory in the LLC according to the embodiment of FIG. 6. In the embodiment, the directory 700 is, for example, configured in the LLC 620 of FIG. 6, and the directory 700 may include an LLC status 702, a core status 704, status indicators 711, 712, 713, 714, 715, 716, 717 and 718, wherein the status indicators 711-718 may respectively correspond to the cores 611-618 of FIG. 6, but the disclosure is not limited thereto.

In an embodiment, a length of the LLC status 702 may be 2 bits, which may be used to represent whether the cache lines of the LLC 620 of FIG. 6 may be shared. A length of the core status 704 may be 2 bits, which may be used to represent whether the cache lines of each of the cores 611-618 in FIG. 6 may be shared, such as whether the cache lines of each of the cores 611-618 may be shared with the LLC 620.

In another embodiment, a length of the LLC status 702 may be 2 bits, which may be used to represent whether the LLC 620 of FIG. 6 may share cache lines with other modules, such as share cache lines with each of the cores 611-618. A length of the core status 704 may be 2 bits, which may be used to represent whether each of the cores 611-618 may share cache lines with the LLC 620.

An individual length of the status indicators 711-718 may be 1 bit, which may be used to record whether a target cache line simultaneously exists in the LLC 620 and the cores 611-618, to indicate a utilization status of each of the cores 611-618 to the LLC 620. Related details may refer to a specification of the MESI protocol or the instructions of the aforementioned embodiments, and details thereof are not repeated.

Figure 8:
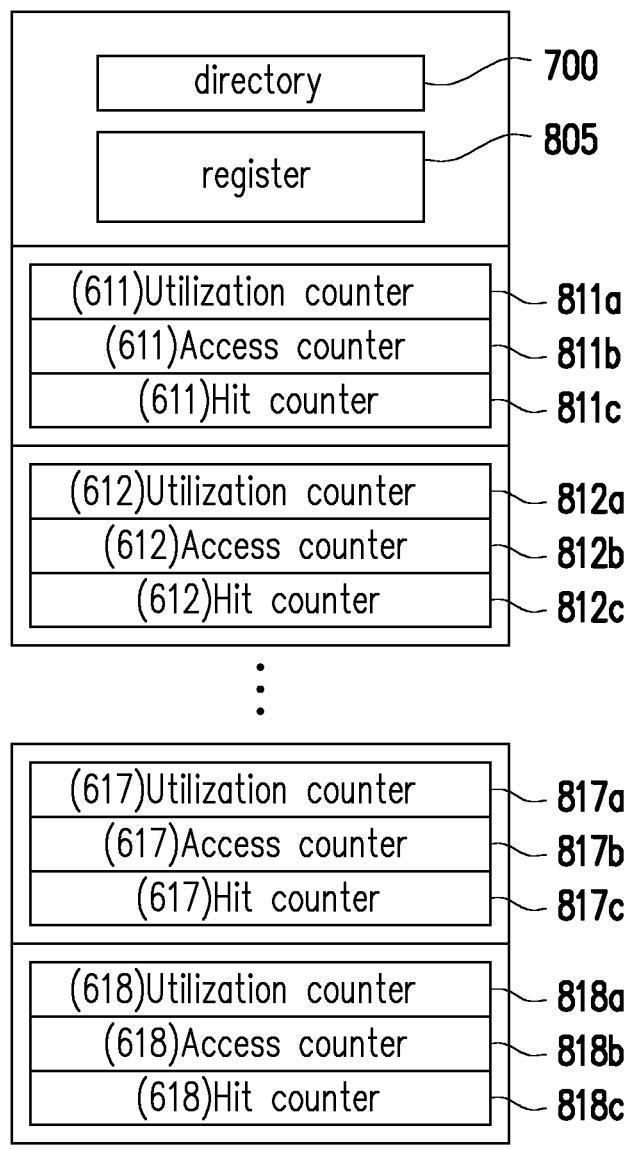
FIG. 8 is a schematic diagram of an LLC according to the embodiment of FIG. 6 and FIG. 7.

Referring to FIG. 8, FIG. 8 is a schematic diagram of an LLC according to the embodiment of FIG. 6 and FIG. 7. In the embodiment, the LLC 620 includes a directory 700, a register 805, utilization counters 811a, 812a, . . . , 817a, 818a, access counters 811b, 812b, . . . , 817b, 818b, and hit counters 811c, 812c, . . . , 817c, 818c.

In the LLC 620, the utilization counter 811a, the access counter 811b and the hit counter 811c may correspond to the core 611 of FIG. 6; the utilization counter 812a, the access counter 812b and the hit counter 812c may correspond to the core 612 of FIG. 6; . . . ; the utilization counter 817a, the access counter 817b and the hit counter 817c may correspond to the core 617 of FIG. 6; the utilization counter 818a, the access counter 818b and the hit counter 818c may correspond to the core 618 of FIG. 6.

In FIG. 8, the utilization counters, the access counters and the hit counters may be used for recording specific counting values for the corresponding cores (i.e. the upper-level cache units of the LLC 620). Description is made below based on the core 611 and the corresponding utilization counter 811a, the access counter 811b and the hit counter 811c.

In an embodiment, the utilization counter 811a may progressively increase or decrease a counting value according to a variation of the status indicator 711 in FIG. 7. For example, when the status indicator 711 is changed from 0 to 1, it represents that the core 611 is using the cache space of the LLC 620, so that the utilization counter 811a may progressively increase its own counting value. Conversely, when the status indicator 711 is changed from 1 to 0, it represents that the core 611 does not use the cache space of the LLC 620, so that the utilization counter 811a may progressively decrease its own counting value. In this case, the higher the counting value of the utilization counter 811a is, the more the core 611 occupies the cache space of the LLC 620, but the disclosure is not limited thereto.

The access counter 811b may record an access number from the core 611. Namely, as long as the LLC 620 detects the access from the core 611, the counting value of the access counter 811b may be progressively increased. In other words, the counting value of the access counter 811b is a total access number of accesses from the core 611 to the LLC 620.

The hit counter 811c may record an access hit number of the core 611 accessing the LLC 620. Namely, when an access from the core 6 hit on the LLC 620, the counting value of the hit counter 811c is progressively increased.

Based on the above instruction, those skilled in the art may learn the operation mechanism of other cores and the corresponding utilization counters, the access counters and the hit counters in FIG. 8, and detail thereof is not repeated.

In the embodiment of the disclosure, the utilization strategy of the core 611 to the LLC 620 is adjusted through the register 805, the utilization counter 811a, the access counter 811b and the hit counter 811c. Similarly, the utilization strategy of any core to the LLC 620 is adjusted through the register 805, the utilization counter, the access counter and the hit counter corresponding to the related core of FIG. 8.

To simplify the related description, the core 611 is taken as an example to describe the technical means of the disclosure, and those skilled in the art should accordingly derive operating mechanisms of other cores.

Generally, the target cache line may be inserted to the MRU position in the LLC 620, which may probably cause a defect of system performance degradation. In order to ameliorate the defect, in the embodiment of the disclosure, by controlling parameters in the register 805, the position of inserting the target cache line to the LLC 620 is adjusted, so that the target cache line may not always be inserted to the MRU position of the LLC 620. The target cache line corresponds to the cache miss of the upper-level cache unit 611, and corresponds to the missed cache line in the LLC 620.

In a different embodiment, the content of the register 806 may be adjusted to implement the aforementioned mechanism of adjusting the insertion position, which is described in detail below.

Figure 9:
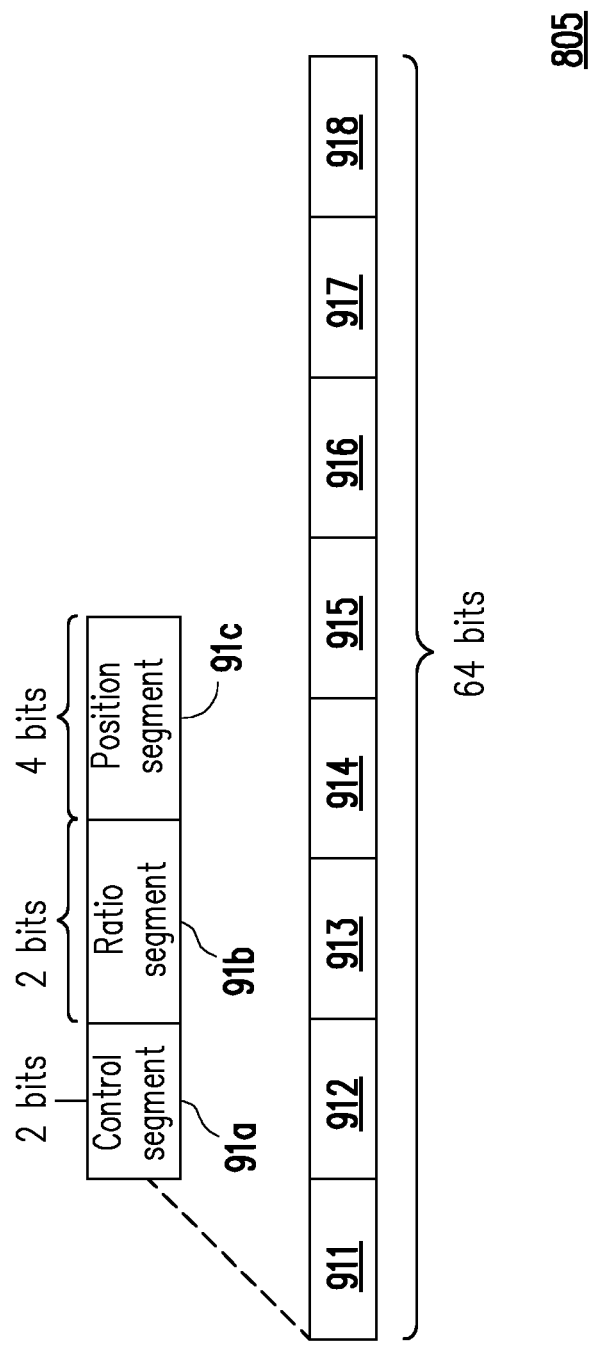
FIG. 9 is a structural diagram of a register of the embodiment of FIG. 8.

Referring to FIG. 9, FIG. 9 is a structural diagram of a register of the embodiment of FIG. 8. As shown in FIG. 9, the register 805 includes segments 911, 912, 913, 914, 915, 916, 917 and 918, wherein the segments 911-918 may respectively correspond to the cores 611-618 of FIG. 6, but the disclosure is not limited thereto.

In the embodiment, each of the segments 911-918 have the same structure, and only the segment 911 corresponding to the core 611 is described below.

In FIG. 9, the segment 911 may include a control segment 91*a*, a ratio segment 91*b* and a position segment 91*c*, wherein individual lengths thereof may be 2 bits, 2 bits and 4 bits, and the length of the register 805 is, for example, 64 bits, but the disclosure is not limited thereto.

The control segment 91*a* may record a control parameter, and the control parameter may instruct to insert the target cache lines to a specified position or the MRU position of the cache lines of the LLC 620. In an embodiment, operations corresponding to the values of the control parameter are shown in a following table 4.

TABLE 4

| Control parameter | Operation |
|---|---|
| 00 | Insert the target cache line to the MRU position |
| 01 | Insert the target cache line to the specified position in collaboration with the ratio segment 91b and the position segment 91c |
| 10 | reserved |
| 11 | reserved |

In detail, when the control parameter is 0 (00), the target cache line may be inserted to the MRU position of the LLC 620, which is a general practice. On the other hand, when the control parameter is 1 (01), the target cache line may be inserted to the specified position in collaboration with the ratio segment 91*b* and the position segment 91*c*. In brief, in the embodiment of the disclosure, the value of the control parameter may be adjusted to determine whether to adopt the general practice or adopt the practice of inserting the target cache line to the specified position.

In other embodiments, the designer may also design corresponding operations for different control parameters according to actual requirements, which is not limited herein.

The ratio segment 91*b* includes an insert ratio parameter, and the insert ratio parameter indicates that the $N^{th}$ target cache line is inserted to the MRU position of the LLC 620 after every (N−1) target cache lines, wherein N is a positive integer. In an embodiment, operations corresponding to the values of the insert ratio parameter are shown in a following table 5.

TABLE 5

| Insert ratio parameter | N | Operation |
|---|---|---|
| 00 | 16 | The target cache line is inserted to the MRU position of the LLC 620 after every 15 cache misses |
| 01 | 32 | The target cache line is inserted to the MRU position of the LLC 620 after every 31 cache misses |
| 10 | 64 | The target cache line is inserted to the MRU position of the LLC 620 after every 63 cache misses |
| 11 | 128 | The target cache line is inserted to the MRU position of the LLC 620 after every 127 cache misses |

It should be noted that if the control parameter is 0 (00), since the target cache line is always inserted to the MRU position, the value of the insert ratio parameter substantially has no effect on the replacement mechanism of the cache lines in the LLC 620. In other words, in the embodiment, only when the control parameter is 1 (01), the value of the insert ratio parameter may has an effect on the replacement mechanism of the cache lines in the LLC 620.

The position segment 91*c* may record an insert position parameter, and the insert position parameter may define the aforementioned specified position. In an embodiment, operations corresponding to the values of the insert position parameter are shown in a following table 6.

TABLE 6

| Insert position parameter | Operation |
|---|---|
| 0000 | The specified position is the MRU position (the $1^{st}$ cache line position) |
| 0001 | The specified position is the $2^{nd}$ cache line position adjacent to the MRU position |
| 0010 | The specified position is the $3^{rd}$ cache line position |
| 0011 | The specified position is the $4^{th}$ cache line position |
| ... | |
| 1110 | The specified position is the $15^{th}$ cache line position |
| 1111 | The specified position is the LRU position (the $16^{th}$ cache line position, K = 16) |

In an overview of the control segment 91*a*, the ratio segment 91*b* and the position segment 91*c*, when the control parameter of the control segment 91*a* is 1(01), (N−1) continuous target cache lines are inserted to the specified position defined by the insert position parameter of the position segment 91*c*, and the $N^{th}$ target cache line is inserted to the MRU position. In this case, the utilization strategy of the core 611 to the LLC 620 may be flexibly adjusted according to the situation that the core 611 occupies the cache space of the LLC 620.

Therefore, the utilization strategy of the core 611 to the LLC 620 may be more flexible, so as to improve the whole operation performance and avoid problems such as cache pollution, etc. To be specific, when the counting value of the utilization counter 811*a* is relatively high, it represents that the core 611 occupies more cache space of the LLC 620. In this case, if a ratio between the access hit number of the hit counter 811c and the access number of the access counter 811b is relatively low, it represents that the cache miss rate is relatively high. In this case, by setting the control parameter of the control segment 91a to 1 (01), in collaboration with the insert ratio parameter in the ratio segment 91b and the insert position parameter in the position segment 91c, the utilization strategy of the core 611 to the LLC 620 may be adjusted, so as to shorten the time that the target cache line exists in the LLC 620. For example, when the cache miss rate of the core 611 is relatively high, the value of N may be set to a larger value by adjusting the insert ratio parameter and/or the specified position may be set to be close to the LRU position by adjusting the insert position parameter.

In this way, after the target cache line is inserted to the specified position of the LLC 620, such target cache line will be moved to the LRU position more quickly along with insertion of the subsequent new target cache lines due to being closer to the LRU position, and will be more quickly removed from the LLC 620. In this way, the cache space of the LLC 620 is not excessively occupied by the core 611 with the higher cache miss rate, so as to achieve better performance.

Conversely, if the ratio between the access hit number of the hit counter 811c and the access number of the access counter 811b is relatively high, it represents that the cache miss rate is relatively low. In this case, by setting the control parameter of the control segment 91a to 1, in collaboration with the insert ratio parameter in the ratio segment 91b and the insert position parameter in the position segment 91c, the utilization strategy of the core 611 to the LLC 620 may also be adjusted, so as to prolong the time that the target cache line exists in the LLC 620. For example, when the cache miss rate of the core 611 is relatively low, the value of N may be set to a smaller value by adjusting the insert ratio parameter and/or the specified position may be set to be farther away from the LRU position by adjusting the insert position parameter.

In this way, after the target cache line is inserted to the specified position of the LLC 620, such target cache line will be pushed to the LRU position slowly along with insertion of the subsequent new target cache lines due to being farther away from the LRU position, so as to prolong the time that the target cache line exists in the LLC 620. In this way, the cache space of the LLC 620 may be configured to the core 611 with the lower cache miss rate, so as to achieve more effective utilization.

Similarly, the control segments 912-918 of the register 805 may also be used to respectively adjust the utilization strategies of the cores 612-618 to the LLC 620, and details thereof are not repeated.

Figure 10:
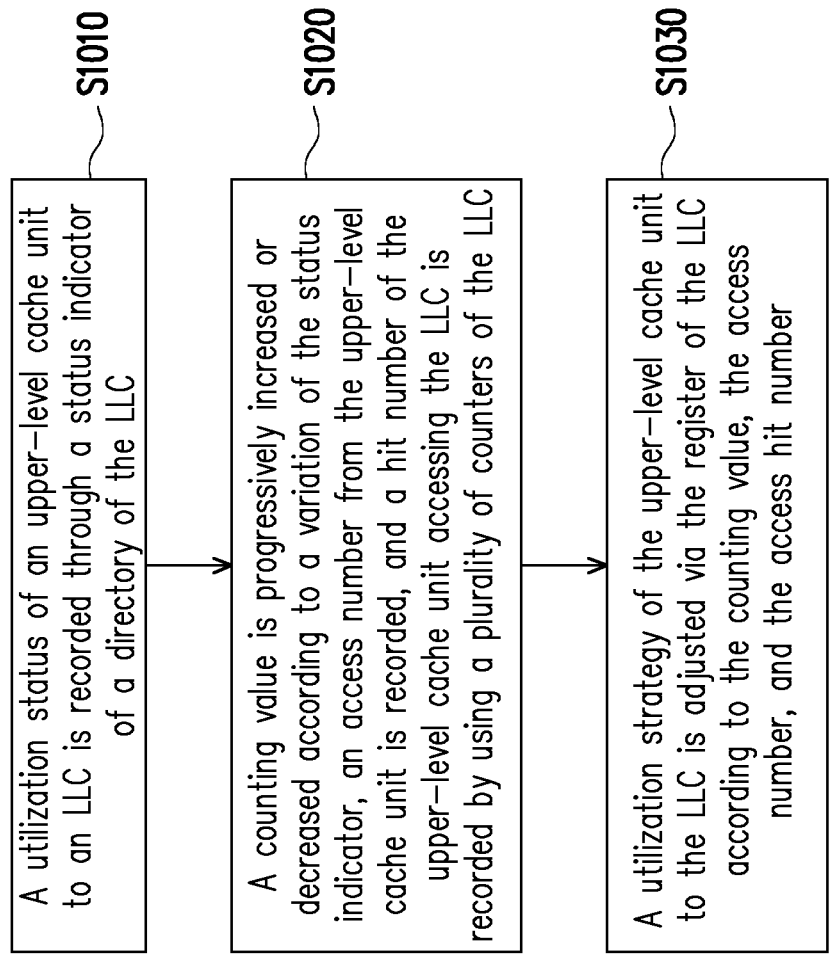
FIG. 10 is a flowchart illustrating an operating method of a cache system according to an embodiment of the disclosure.

Referring to FIG. 10, FIG. 10 is a flowchart illustrating an operating method of a cache system according to an embodiment of the disclosure. Firstly, in a step S1010, a utilization status of an upper-level cache unit to an LLC is recorded through a status indicator of a directory of the LLC. In a step S1020, a counting value is progressively increased or decreased according to a variation of the status indicator, an access number from the upper-level cache unit is recorded, and a hit number of the upper-level cache unit accessing the LLC is recorded by using a plurality of counters of the LLC. In a step S1030, a utilization strategy of the upper-level cache unit to the LLC is adjusted via the register of the LLC according to the counting value, the access number, and the access hit number.

Details of the above steps have been described in the aforementioned embodiments, so that the details are not repeated.

In summary, the cache system and the operating method thereof provided by the disclosure may adjust the utilization strategy of the upper-level cache unit to the LLC through the directory, the register configured in the LLC, and the counting value of the utilization counter, the access number of an access counter and the access hit number of the hit counter corresponding to each of the upper-level cache units. To be specific, through the control segment, the ratio segment and the position segment in each segment of the utilization configure segment, (N−1) continuous target cache lines with cache misses in the LLC are inserted to the specified position defined by the insert position parameter of the position segment, and the $N^{th}$ target cache line with the cache miss in the LLC is inserted to the MRU position. In this way, the utilization strategy of each upper-level cache unit to the LLC is more flexible, so as to improve an overall operation performance, and avoid problems such as cache pollution, etc.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. A cache system, comprising:
  a first upper-level cache unit;
  a last level cache, coupled to the first upper-level cache unit, comprising:
    a directory, comprising a first status indicator, the first status indicator is configured to record an utilization status of the first upper-level cache unit to the last level cache;
    a plurality of first counters, respectively increasing or decreasing a first counting value according to the first status indicator, recording a first access number from the first upper-level cache unit, and recording a first access hit number of the first upper-level cache unit accessing the last level cache; and
    a register, recoding a first parameter, the first parameter is selected according to the first counting value, the first access number, and the first access hit number, so as to adjust an utilization strategy of the first upper-level cache unit to the last level cache.

2. The cache system as claimed in claim 1, wherein the last level cache further comprises a plurality of cache lines, the first parameter determines an insertion position of a target cache line corresponding to the first upper-level cache unit to insert to the plurality of cache lines.

3. The cache system as claimed in claim 2, wherein the number of the plurality of cache lines is K, K is a positive integer, a first one of the plurality of cache lines is most recently used, and locates at a first cache line position, a $K^{th}$ cache line of the plurality of cache lines is least recently used, and locates at a $K^{th}$ cache line position, wherein when the target cache line is inserted to the insertion position, an order of the plurality of cache lines after the insertion position is increased, and the $K^{th}$ cache line of the plurality of original cache lines is removed.

4. The cache system as claimed in claim 1, wherein the register comprises:
  a first control segment, recording a control parameter, the control parameter instructs to insert a target cache line corresponding to the first upper-level cache unit to a specified position or a first cache line position;

a first ratio segment, recording an insert ratio parameter, the insert ratio parameter instructs to insert the $N^{th}$ target cache line corresponding to the first upper-level cache unit to the first cache line position after every (N−1) target cache lines, wherein N is a positive integer; and a first position segment, recording an insert position parameter, the insert position parameter defines the specified position, wherein the first parameter comprises the control parameter, the ratio parameter and the insert position parameter.

5. The cache system as claimed in claim 4, wherein when the control parameter is a first value, the target cache line corresponding to the first upper-level cache unit is inserted to the first cache line position; and when the control parameter is a second value, the (N−1) target cache lines corresponding to the first upper-level cache unit are inserted to the specified position, and the $N^{th}$ target cache line corresponding to the first upper-level cache unit is inserted to the first cache line position.

6. The cache system as claimed in claim 1, when the first status indicator is changed from a first value to a second value, the first counting value is increased, and when the first status indicator is changed from the second value to the first value, the first counting value is decreased.

7. The cache system as claimed in claim 1, wherein the first upper-level cache unit is a first level cache, and the last level cache is a second level cache.

8. The cache system as claimed in claim 1, further comprising a second upper-level cache unit coupled to the last level cache, the directory of the last level cache further comprises a second status indicator, and the second status indicator is configured to record a second utilization status of the second upper-level cache unit to the last level cache, and the last level cache further comprises:

a plurality of second counters, are respectively configured to increase or decrease a second counting value according to a variation of the second status indicator, record a second access number from the second upper-level cache unit, and record a second access hit number of the second upper-level cache unit accessing the last level cache, wherein a second parameter of the register is selected according to the second counting value, the second access number, and the second access hit number, so as to adjust the utilization strategy of the second upper-level cache unit to the last level cache.

9. The cache system as claimed in claim 8, wherein the register comprises:

a first control segment, recording a first control parameter, wherein the first control parameter instructs to insert a target cache line corresponding to the first upper-level cache unit to a first specified position or a first cache line position;

a first ratio segment, recording a first insert ratio parameter, wherein the first insert ratio parameter instructs to insert the $N^{th}$ target cache line corresponding to the first upper-level cache unit to the first cache line position after every (N−1) target cache lines corresponding to the first upper-level cache unit, wherein N is a positive integer;

a first position segment, recording a first position parameter defining the first specified position;

a second control segment, recording a second control parameter, wherein the second control parameter instructs to insert the target cache line corresponding to the second upper-level cache unit to a second specified position or the first cache line position;

a second ratio segment, recording a second insert ratio parameter, wherein the second insert ratio parameter instructs to insert the $M^{th}$ target cache line corresponding to the second upper-level cache unit to the first cache line position after every (M−1) target cache lines corresponding to the second upper-level cache unit, wherein M is a positive integer; and a second position segment, recording a second position parameter defining the second specified position, wherein the second parameter comprises the second control parameter, the second insert ratio parameter and the second position parameter.

10. The cache system as claimed in claim 8, wherein the first upper-level cache unit and the second upper-level cache unit are first level caches, the last level cache is a second level cache, and the first upper-level cache unit and the second upper-level cache unit belong to an identical core.

11. The cache system as claimed in claim 8, wherein the first upper-level cache unit and the second upper-level cache unit are first level caches, the last level cache is a second level cache, and the first upper-level cache unit and the second upper-level cache unit belong to different cores.

12. The cache system as claimed in claim 8, wherein the first upper-level cache unit and the second upper-level cache unit belong to different cores and respectively comprise a first level cache and a second level cache, the last level cache is a third level cache.

13. The cache system as claimed in claim 8, wherein the directory further comprises a share status indicator recording whether the first upper-level cache unit or the second upper-level cache unit is sharable.

14. An operating method of a cache system, wherein the cache system comprises a first upper-level cache unit and a last level cache coupled together, the operating method comprising:

recording an utilization status of the upper-level cache unit to the last level cache through a first status indicator of a directory of the last level cache;

increasing or decreasing a first counting value according to the first status indicator, recording a first access number from the first upper-level cache unit, and recording a first access hit number of the first upper-level cache unit accessing the last level cache respectively by using a plurality of first counters of the last level cache; and selecting a first parameter of a register of the last level cache according to the first counting value, the first access number, and the first access hit number, so as to adjust an utilization strategy of the first upper-level cache unit to the last level cache.

15. The operating method of the cache system as claimed in claim 14, wherein the last level cache further comprises a plurality of cache lines, and the operating method further comprises:

determining an insertion position of a target cache line corresponding to the first upper-level cache unit to insert to the plurality of cache lines through the first parameter.

16. The operating method of the cache system as claimed in claim 15, wherein the number of the plurality of cache lines is K, K is a positive integer, a first one of the plurality of cache lines is most recently used, and locates at a first cache line position, a $K^{th}$ cache line of the plurality of cache lines is the least recently used, and locates at a $K^{th}$ cache line position, wherein when the target cache line is inserted to the insertion position, the operating method further comprises:

increasing an order of the plurality of cache lines after the insertion position, and removing the $K^{th}$ cache line of the plurality of original cache lines.

17. The operating method of the cache system as claimed in claim 14, wherein the register comprises a first control segment, a first ratio segment and a first position segment, and the operating method further comprises:

recording a control parameter through the first control segment, wherein the control parameter instructs to insert a target cache line corresponding to the first upper-level cache unit to a specified position or a first cache line position;

recording an insert ratio parameter through the first ratio segment, wherein the insert ratio parameter instructs to insert the $N^{th}$ target cache line corresponding to the first upper-level cache unit to the first cache line position after every (N−1) target cache lines, wherein N is a positive integer; and recording an insert position parameter through the first position segment, wherein the insert position parameter defines the specified position, wherein the first parameter comprises the control parameter, the ratio parameter and the insert position parameter.

18. The operating method of the cache system as claimed in claim 17, when the control parameter is a first value, inserting the target cache line corresponding to the first upper-level cache unit to the first cache line position; and when the control parameter is a second value, inserting the (N−1) target cache lines corresponding to the first upper-level cache unit to the specified position, and inserting the $N^{th}$ target cache line corresponding to the first upper-level cache unit to the first cache line position.

19. The operating method of the cache system as claimed in claim 14, further comprises:

increasing the first counting value when the first status indicator is changed from a first value to a second value; and decreasing the first counting value when the first status indicator is changed from the second value to the first value.

20. The operating method of the cache system as claimed in claim 14, wherein the first upper-level cache unit is a first level cache, and the last level cache is a second level cache.

21. The operating method of the cache system as claimed in claim 14, wherein the cache system further comprises a second upper-level cache unit coupled to the last level cache, and the operating method further comprises:

recording the utilization status of the second upper-level cache unit to the last level cache through a second status indicator of the directory of the last level cache;

respectively increasing or decreasing a second counting value through a plurality of second counters of the last level cache according to a variation of the second status indicator, recording a second access number from the second upper-level cache unit, and recording a second access hit number of the second upper-level cache unit accessing the last level cache; and selecting a second parameter of the register according to the second counting value, the second access number, and the second access hit number, so as to adjust the utilization strategy of the second upper-level cache unit to the last level cache.

22. The operating method of the cache system as claimed in claim 21, wherein the register comprises a first control segment, a first ratio segment, a first position segment, a second control segment, a second ratio segment and a second position segment, and the operating method comprises:

recording a first control parameter through the first control segment, wherein the first control parameter instructs to insert a target cache line corresponding to the first upper-level cache unit to a first specified position or a first cache line position;

recording a first insert ratio parameter through the first ratio segment, wherein the first insert ratio parameter instructs to insert the $N^{th}$ target cache line corresponding to the first upper-level cache unit to the first cache line position after every (N−1) target cache lines corresponding to the first upper-level cache unit, wherein N is a positive integer;

recording a first position parameter defining the first specified position through the first position segment;

recording a second control parameter through the second control segment, wherein the second control parameter instructs to insert the target cache line corresponding to the second upper-level cache unit to a second specified position or the first cache line position;

recording a second insert ratio parameter through the second ratio segment, wherein the second insert ratio parameter instructs to insert the $M^{th}$ target cache line corresponding to the second upper-level cache unit to the first cache line position after every (M−1) target cache lines corresponding to the second upper-level cache unit, wherein M is a positive integer; and recording a second position parameter defining the second specified position through the second position segment, wherein the second parameter comprises the second control parameter, the second insert ratio parameter and the second position parameter.

23. The operating method of the cache system as claimed in claim 21, wherein the first upper-level cache unit and the second upper-level cache unit are first level caches, the last level cache is a second level cache, and the first upper-level cache unit and the second upper-level cache unit belong to an identical core.

24. The operating method of the cache system as claimed in claim 21, wherein the first upper-level cache unit and the second upper-level cache unit are first level caches, the last level cache is a second level cache, and the first upper-level cache unit and the second upper-level cache unit belong to different cores.

25. The operating method of the cache system as claimed in claim 21, wherein the first upper-level cache unit and the second upper-level cache unit belong to different cores and respectively comprise a first level cache and a second level cache, the last level cache is a third level cache.

26. The operating method of the cache system as claimed in claim 21, wherein the directory further comprises a share status indicator recording whether the first upper-level cache unit or the second upper-level cache unit is sharable.

* * * * *